(12) United States Patent
Semple et al.

(10) Patent No.: US 10,677,033 B2
(45) Date of Patent: Jun. 9, 2020

(54) PRESSURE COMPENSATED MOTOR POWER LEAD CONNECTION FOR SUBMERSIBLE PUMP

(71) Applicant: Baker Hughes, a GE Company, LLC, Houston, TX (US)

(72) Inventors: Ryan P. Semple, Owasso, OK (US); David Tanner, Broken Arrow, OK (US)

(73) Assignee: Baker Hughes, a GE Company, LLC, Houston, TX (US)

(*) Notice: Subject to any disclaimer, the term of this patent is extended or adjusted under 35 U.S.C. 154(b) by 286 days.

(21) Appl. No.: 15/872,174

(22) Filed: Jan. 16, 2018

(65) Prior Publication Data
US 2018/0202271 A1 Jul. 19, 2018

Related U.S. Application Data

(60) Provisional application No. 62/447,973, filed on Jan. 19, 2017.

(51) Int. Cl.
*E21B 43/12* (2006.01)
*H02K 5/132* (2006.01)
*E21B 33/12* (2006.01)

(52) U.S. Cl.
CPC ........ *E21B 43/128* (2013.01); *E21B 33/1208* (2013.01); *H02K 5/132* (2013.01); *H02K 2205/09* (2013.01)

(58) Field of Classification Search
CPC ........ H02K 5/12; H02K 5/1285; H02K 5/132; E21B 43/128; E21B 33/1208; F04D 13/086; F04D 13/10; F04D 29/086
(Continued)

(56) References Cited

U.S. PATENT DOCUMENTS 4,436,488 A * 3/1984 Witten .................... F04B 47/06 310/87
7,611,339 B2 11/2009 Tetzlaff et al.
(Continued)

FOREIGN PATENT DOCUMENTS

WO 2005083225 A1 9/2005

OTHER PUBLICATIONS

International Search Report and Written Opinion dated May 1, 2018 for corresponding PCT/US2018/014262.
(Continued)

*Primary Examiner* — Charles G Freay
(74) *Attorney, Agent, or Firm* — Bracewell LLP; James E. Bradley

(57) ABSTRACT

A well pump electrical motor has a motor housing filled with a dielectric motor lubricant. A motor head has at least one motor lead passage in fluid communication with the motor lubricant. An outer seal, which is exposed to well fluid, seals around a motor lead in the motor lead passage. An inner seal seals around the motor lead in the motor lead passage inward from the outer seal and has an inner side in contact with the motor lubricant in the motor. A barrier fluid passage extends into an annular space between the inner and outer seals and contains a barrier fluid. A pressure compensating device has an inner side in contact with the barrier fluid in the barrier fluid passage for reducing a pressure differential between the barrier fluid and a hydrostatic fluid pressure of well fluid on the exterior of the motor.

20 Claims, 5 Drawing Sheets

(58) Field of Classification Search
USPC .......................................................... 310/87
See application file for complete search history.

(56) References Cited

U.S. PATENT DOCUMENTS

| | | | |
|---|---|---|---|
| 7,857,604 B2 | 12/2010 | Shaw et al. | |
| 8,816,196 B2* | 8/2014 | Williams | E21B 33/04 |
| | | | 174/20 |
| 8,905,727 B2* | 12/2014 | Frey | F04B 47/06 |
| | | | 417/414 |
| 8,910,718 B2* | 12/2014 | Watson | E21B 43/128 |
| | | | 166/105 |
| 10,097,060 B2* | 10/2018 | Rumbaugh | H01R 13/523 |
| 2009/0010773 A1 | 1/2009 | Parmeter et al. | |
| 2016/0102659 A1* | 4/2016 | Gilmore | H02K 5/132 |
| | | | 417/410.1 |
| 2016/0222770 A1 | 8/2016 | Kirk et al. | |
| 2017/0070119 A1* | 3/2017 | Lee | H02K 5/225 |

OTHER PUBLICATIONS

J. Knapp, et al. U.S. Appl. No. 15/720,805, Metal-to-Metal Sealed Power Connection for Submersible Pump Motor, filed Sep. 29, 2017.

* cited by examiner

PRESSURE COMPENSATED MOTOR POWER LEAD CONNECTION FOR SUBMERSIBLE PUMP

CROSS REFERENCE TO RELATED APPLICATION

This application claims priority to provisional patent application Ser. No. 62/447,973, filed Jan. 19, 2017.

FIELD OF INVENTION

The present disclosure relates to downhole pumping systems for well bore fluids. More specifically, the present disclosure relates to a seal arrangement between power leads and the motor that is pressure compensated with a pressure compensation device that can be isolated from test pressure during pressure testing of the seal arrangement.

BACKGROUND

Electrical submersible pumps are commonly used to pump well fluid from hydrocarbon bearing wells. A power cable extends from the wellhead to the pump motor to power the motor. Various connectors connect a motor lead portion of the power cable to the motor. In one type, the motor lead portion comprises a separate metal tube for each phase. Each metal tube contains an insulated conductor that connects to a motor wire of the motor.

The motor is filled with a dielectric lubricant. A pressure compensator reduces a difference between the hydrostatic pressure of the well fluid and the motor lubricant. Proposals have also been made to pressure compensate any difference between hydrostatic well fluid pressure and fluid contained within the motor lead connectors.

SUMMARY

A well pump assembly comprises an electrical motor for driving a pump, the motor having a motor housing filled with a dielectric motor lubricant. A motor head on an end of the housing has at least one motor lead passage extending from an interior of the housing to an exterior of the motor head. The motor lead passage is in fluid communication with the motor lubricant. A motor lead extends from the exterior of the motor head into the motor lead passage. An outer seal seals around the motor lead in the motor lead passage. The outer seal has an outer side adapted to be exposed to well fluid. An inner seal seals around the motor lead in the motor lead passage inward from the outer seal. The inner seal has an inner side in contact with the motor lubricant in the motor. The outer and inner seals define between them an annular space in the motor lead passage. A barrier fluid passage extends into the annular space and contains a barrier fluid that is in contact with an inner side of the outer seal and an outer side of the inner seal. A pressure compensating device has an inner side in contact with the barrier fluid in the barrier fluid passage for reducing a pressure differential between the barrier fluid and a hydrostatic fluid pressure of well fluid on the exterior of the motor.

In an embodiment, a test port extends from the exterior of the motor head to a junction with the barrier fluid passage, the junction being between the pressure compensating device and the annular space. Means are disclosed for applying a test pressure to the test port and for blocking the test pressure from the pressure compensating device.

In the embodiment shown, the means for applying a test pressure comprises a test tool having a tubular stem that is insertable into the test port. The stem has a stem seal that seals between the stem and the barrier fluid passage at a point between the annular space and the junction. The stem seal isolates a stem passage in the stem from the pressure compensating device.

In the embodiment shown, there are a plurality of motor lead passages. A barrier fluid reservoir is in the head. A pressure equalizing chamber in the head contains a pressure compensating device. The barrier fluid passage has a plurality of first portions, each of the first portions extending from the annular space in one of the motor lead passages to the barrier fluid reservoir. The barrier fluid passage has a second portion extending from the barrier fluid reservoir to the pressure equalizing chamber.

The barrier fluid reservoir may be annular and concentric with a longitudinal axis of the head.

In this embodiment, the test port extends through the second portion of the barrier fluid passage into the barrier fluid reservoir. The stem of the test tool inserts into sealing engagement with the barrier fluid reservoir, thereby communicating the stem passage in the stem to the barrier fluid reservoir and blocking the second portion of the barrier fluid passage from the stem passage.

The motor lead may comprise a metal tube containing an insulated conductor. Each of the outer and inner seals may comprise a ferrule that forms a metal-to-metal sealing engagement between the metal tube and the motor lead passage. A spacer ring is located in the annular space between the outer and inner seals, the spacer ring being in non-sealing engagement with the motor lead passage. A nut at an entrance of the motor lead passage exerts an inward directed force against outer seal when rotated. The force passes through the spacer ring to the inner seal to deform the ferrules of the outer and inner seals into sealing and retaining engagement with the motor lead passage.

In one example, the barrier fluid passage has an inner end having internal threads. The pressure compensating device comprises a metal bellows mounted in the inner end and having external threads that engage the internal threads. The inner end of the barrier fluid passage may be open to the interior of the housing. The bellows separates the motor lubricant in the interior of the housing from the barrier fluid in the barrier fluid passage.

Figure 1:
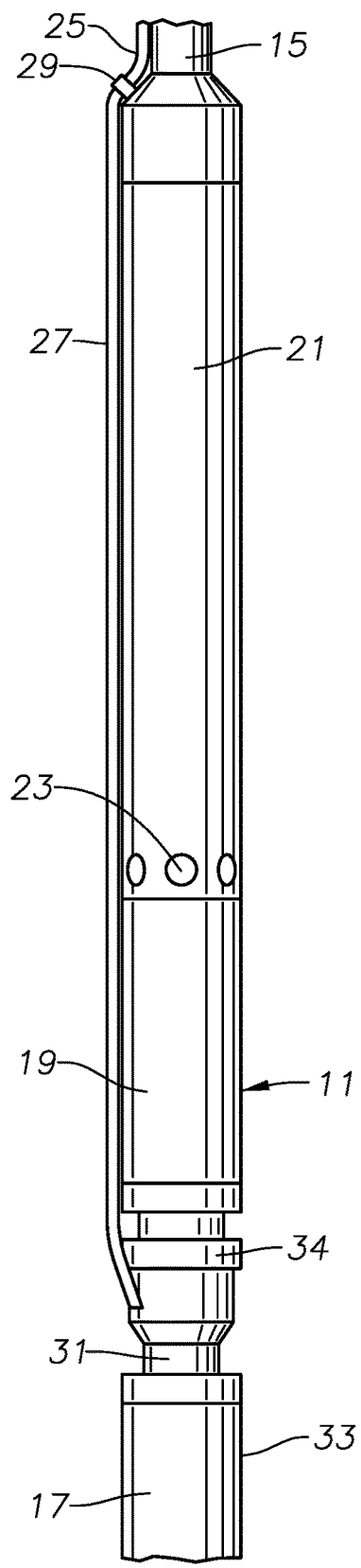
FIG. 1 is a side elevational view of an electrical submersible pump having a motor lead connection in accordance with this disclosure.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows an electrical submersible pump (ESP) 11 suspended on a string of production tubing 15 within a well. ESP 11 is shown vertically oriented; however, it could be located in an inclined or horizontal section of the well. Thus, the terms "upper", "lower" and the like are used only for convenience. ESP 11 includes an electrical motor 17 that is filled with a dielectric motor lubricant. In this example, a pressure equalizer 19 couples to the upper end of motor 17. Pressure equalizer 19 equalizes the internal lubricant pressure in motor 17 with the hydrostatic pressure of the well fluid contained in the well. Pressure equalizer 19 could alternately be mounted to the lower end of motor 17, rather than the upper end as shown.

A pump 21 couples to the upper end of pressure equalizer 19 in this embodiment. Alternately, pump 21 could be mounted below motor 17. Pump 21 has an intake 23 that draws in well fluid from the well into pump 21 and discharges it into production tubing 15. If a gas separator (not shown) is employed, it would be connected to the lower end of pump 21, and intake 23 would be in the gas separator. Pump 21 may be a centrifugal pump having a large number of stages, each stage comprising an impeller and a diffuser. Alternately, pump 21 could be another rotary type, such as a progressing cavity pump. Also, pump 21 could be a reciprocating, plunger type of pump if a rotary to linear transfer mechanism is used.

A power cable 25 extends from a wellhead at the upper end of the well and is strapped to production tubing 15. A motor lead 27 is connected to a lower end of power cable 25 by a splice 29 and extends alongside ESP 11. The lower end of motor lead 27 extends into a motor head 31 on the upper end of motor 17 for supplying power to motor 17. Motor head 31 connects to a motor housing 33 of motor 17. The upper end of motor head 31 connects to a bolt flange 34 at the lower end of pressure equalizer 19. A threaded collar could be employed instead of bolt flange 34.

Figure 2:
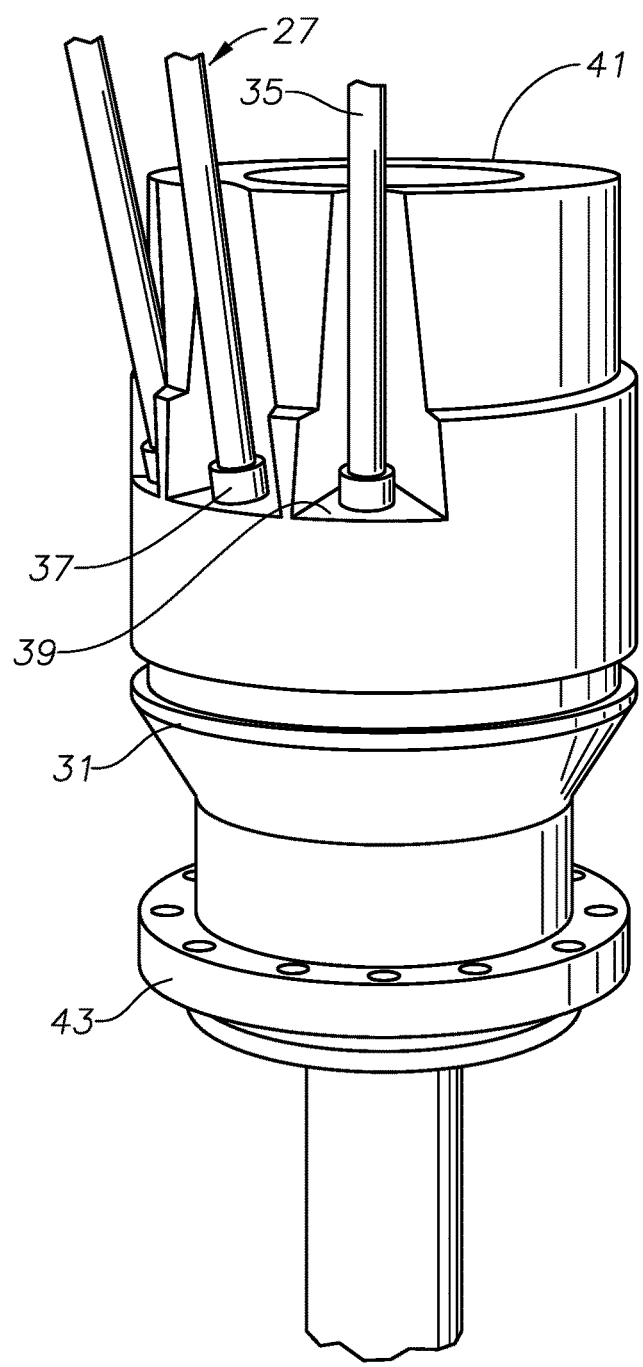
FIG. 2 is a perspective view of a motor head with three motor lead connections in accordance with this disclosure.
Figure 3:
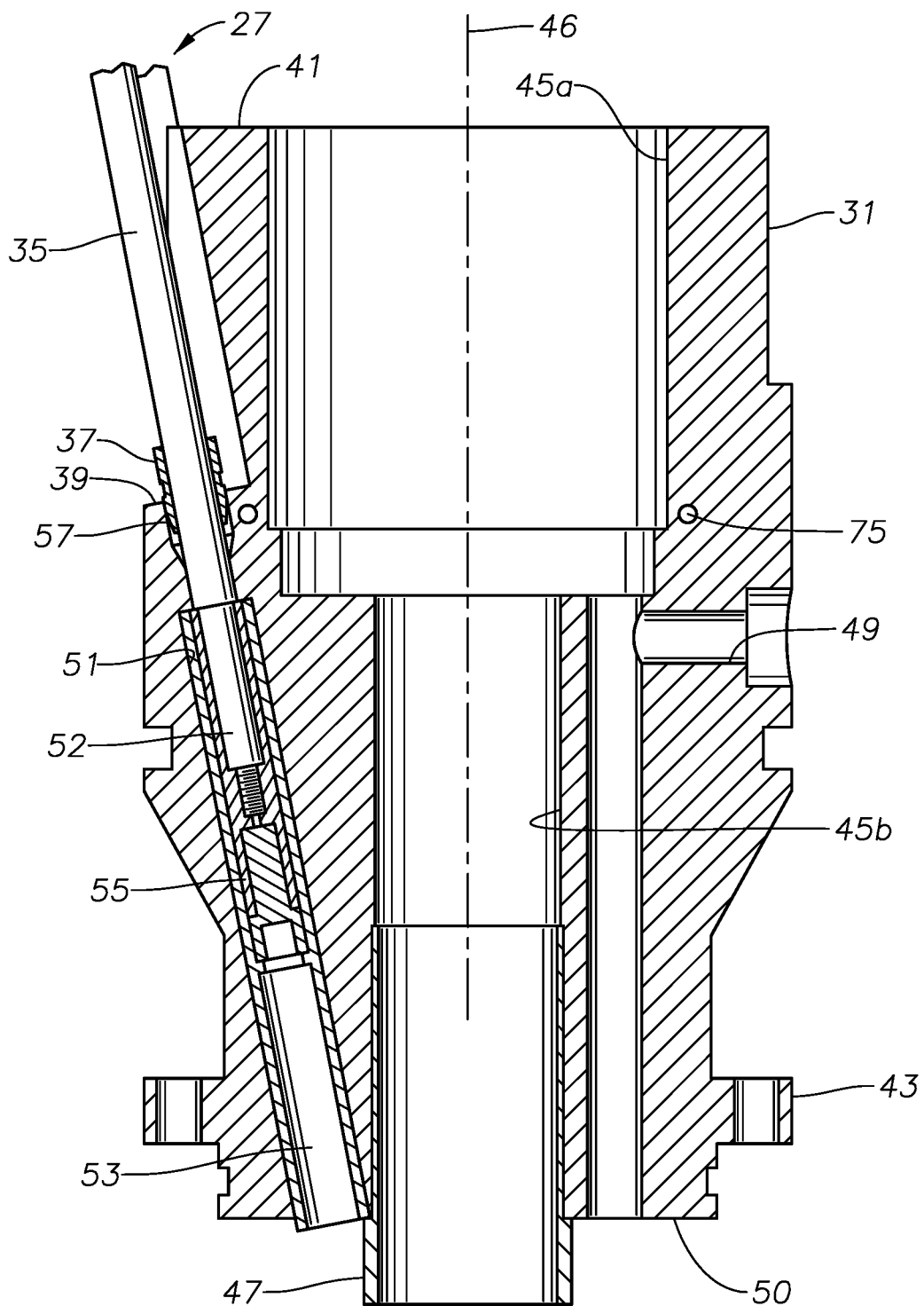
FIG. 3 is a sectional view of the motor head of FIG. 2.

Referring to FIG. 2, in this example, motor lead 27 comprises three separate stainless steel tubes 35 that are spaced apart from each other. Each metal tube 35 contains an insulated conductor 52 (FIG. 4) that supplies one phase of three-phase power to motor 17. Each metal tube 35 is spliced to power cable 25 (FIG. 1), which typically comprises a bundle of three insulated conductors. Alternately, metal tubes 35 could extend entirely to the wellhead at the surface. A separate threaded nut 37 is used to apply the force to secure each metal tube 35 to motor head 31. Each nut 37 protrudes from a recessed base or shoulder 39 on the exterior of motor head 31.

Motor head 31 has an upper rim 41 containing threaded bolt holes (not shown) for securing to pressure equalizer bolt flange 34 (FIG. 1). Motor head 31 may have a lower bolt flange 43 with bolt holes on its lower end for connecting to motor housing 33 (FIG. 1). Motor head 31 has an axially extending bore with a larger diameter upper portion 45a and a smaller diameter lower portion 45b, each concentric with a longitudinal axis 46. A protective tube 47 may extend into the lower end of bore smaller portion 45b and from motor head 31 into motor housing 33 (FIG. 1). A motor lubricant fill port 49 may extend from the exterior through motor head 31 to lower end 50 of motor head 31.

A motor lead passage 51 for each metal tube 35 extends from motor head shoulder 39 downward to motor head lower end 50. Motor lead passage 51 may be inclined relative to axis 46, as shown. An insulated motor lead conductor 52 extends from the lower end of motor lead tube 35 into motor lead passage 51. A motor wire 53 extends from stator windings (not shown) in motor housing 33 (FIG. 1) upward into motor lead passage 51. Motor lead conductor 52 and motor wire 53 have conventional electrical terminals 55 on their ends that connect to each other within motor lead passage 51. A seal assembly 57 is located in an upper portion of motor lead passage 51 for sealing between motor lead tube 35 and the side wall of motor lead passage 51.

Figure 4:
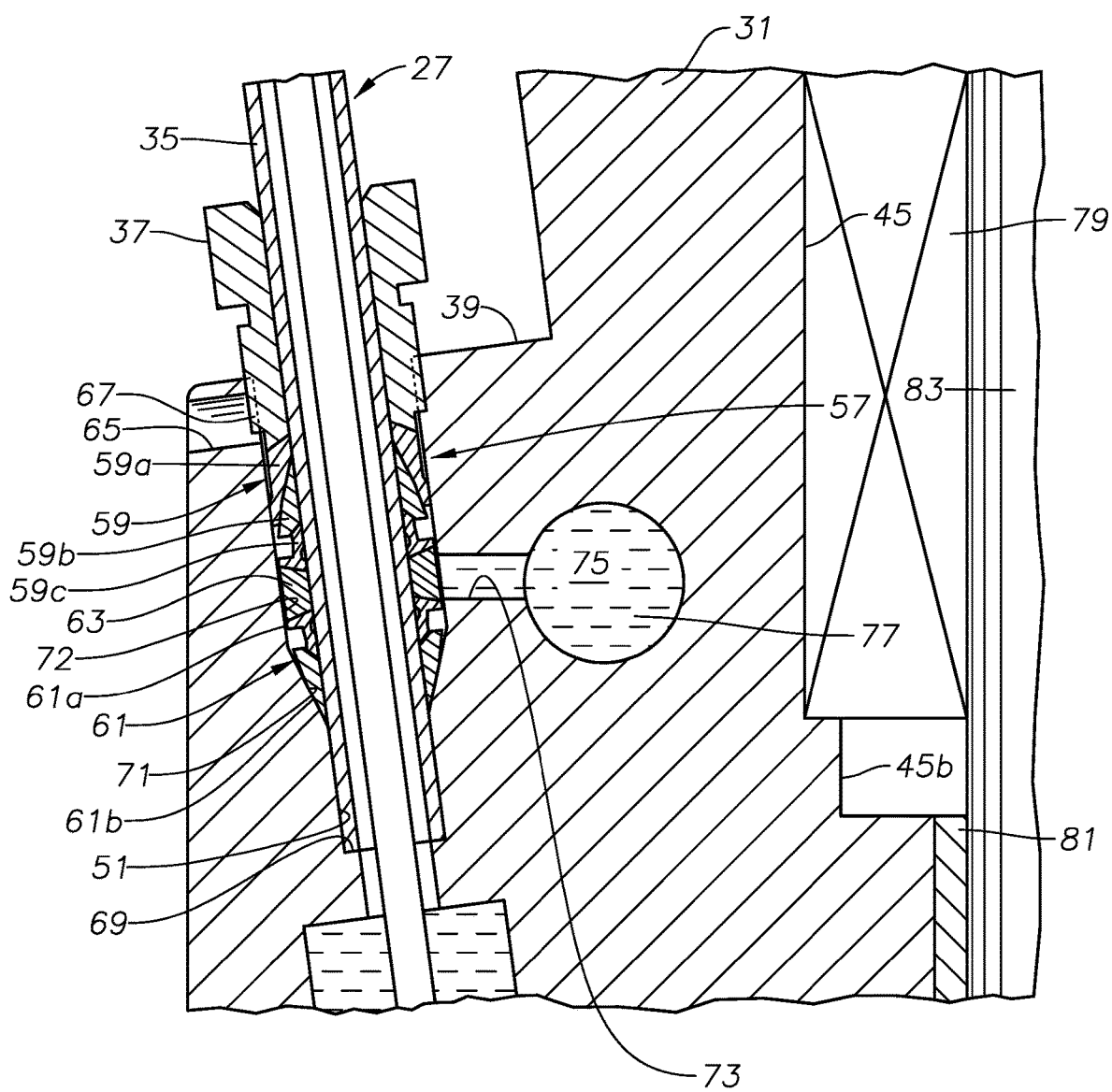
FIG. 4 is an enlarged sectional and schematic view of the encircled portion in FIG. 2, with the motor head shown attached to the motor and also showing the seal assembly for one of the motor leads.

Seal assembly 57 may be various types. Referring to FIG. 4, in this example, seal assembly 57 has an upper or outer seal 59 and a lower or inner seal 61, each of which forms a separate metal-to-metal sealing engagement between motor lead passage 51 and motor lead tube 35. The upper side of upper seal 59 is exposed to well fluid in the well. Upper seal 59 may have three metal, deformable ferrules 59a, 59b and 59c, but the number could differ. Lower seal 61 is illustrated as having two metal, deformable ferrules 61a, 61b, but the number could differ.

A rigid, non-deformable spacer ring 63 separates upper seal ferrule 59c from lower seal ferrule 61a. Spacer ring 63 does not seal to the inner wall of motor lead passage 51. In this example, the outer diameter of spacer ring 63 is smaller than the inner diameter of motor lead passage 51. A bleed port 65 may extend from the vicinity of nut threads 67 to the exterior to bleed off any trapped pressure between nut 37 and upper seal 59 when nut 37 is being secured. Motor lead passage 51 has an upward facing shoulder 69 that is abutted by the lower end of metal tube 35. A downward tapered surface 71 is located in the portion of motor lead passage 51 that contains lower seal ferrule 61b.

Tightening nut 37 exerts a downward force on upper seal ferrules 59a, 59b and 59c, which transfers through spacer ring 63 to lower seal ferrules 61a, 61b and tapered surface 71. The downward force reacting by tapered surface 71 permanently deforms ferrules 59a, 59b and 59c and ferrules 61a, 61b into sealing engagement with metal tube 35 and the side wall of motor lead passage 51. In addition, the deformed ferrules 59, 61 provide a retaining force on metal tube 35 against differential pressures that could act to push metal tube 35 out of motor lead passage 51.

The sealing engagement of upper seal 59 and lower seal 61 defines an annular space 72 in motor lead passage 51. Annular space 72 is sealed from well fluid in motor lead passage 51 by upper seal 59. Lower seal 61 seals annular space 72 from a dielectric motor lubricant 85 in motor lead passage 51. Spacer ring 63 is located within annular space 72.

A separate barrier fluid passage first portion 73 extends from annular space 72 in each motor lead passage 51 to a single internal annular reservoir 75. Reservoir 75 may encircle bore portion 45b concentric with axis 46. In this example, reservoir 75 is circular when viewed in the transverse cross section of FIG. 4, but other shapes are feasible. Reservoir 75 contains a liquid that is referred to herein as a dielectric barrier fluid 77. Barrier fluid passage first portion 73 joins motor lead passage 51 at annular space 72, communicating barrier fluid 77 with the space in motor lead passage 51 between upper and lower seals 59, 61.

Referring still to FIG. 4, motor head 31 may have a conventional thrust bearing 79 in bore larger portion 45a and a conventional bushing or radial bearing 81 in bore smaller portion 45b. A motor drive shaft 83 extends through protective tube 47 and bore portions 45a, 45b in engagement with bearings 79, 81. Protective tube 47 prevents contact of motor wires 53 with the rotating drive shaft 83.

Dielectric motor lubricant 85 fills housing 33 (FIG. 1) of motor 17. Barrier fluid 77 and motor lubricant 85 are not in contact with each other, but may be the same fluids. Motor lubricant 85 communicates through radial bearing 81 and thrust bearing 79 to pressure equalizer 19 (FIG. 1). Dielectric lubricant 85 also communicates with the lower portion of each motor lead passage 51 up to lower seal ferrule 61b. In this example, insulated motor lead conductor 52 has a smaller outer diameter than the inner diameter of metal tube 35, thus motor lubricant 85 communicates with the annular clearance between insulated motor lead conductor 52 and metal tube 35. A seal (not shown), such as at splice 29 (FIG. 1), seals the annular clearance between insulated motor lead conductor 52 and metal tube 35, preventing well fluid from communicating with motor lubricant 85 within metal tube 35. Alternately, the insulation of insulated motor lead conductor 52 could be in tight sealing engagement with the inner diameter of metal tube 35.

As mentioned above, pressure equalizer 19 communicates with motor lubricant 85 in motor 17 and reduces a pressure difference between well fluid on the exterior of motor 17 with motor lubricant 85. Pressure equalizer 19 thus tends to equalize the pressure of motor lubricant 85 within the lower portion of motor lead passage 51 with the exterior hydrostatic pressure.

Figure 5:
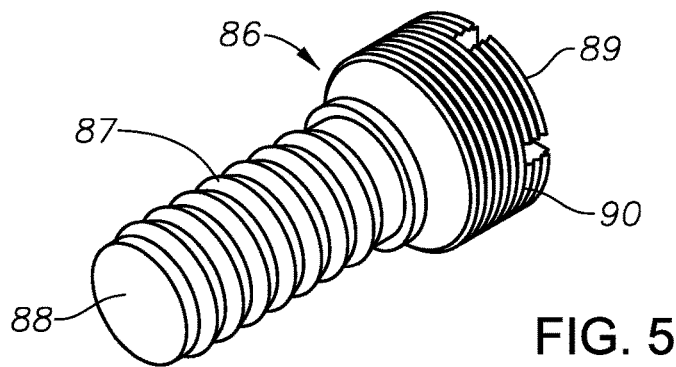
FIG. 5 is a perspective view of a pressure compensating device for the seal assembly of FIG. 4, shown removed from the motor head.
Figure 6:
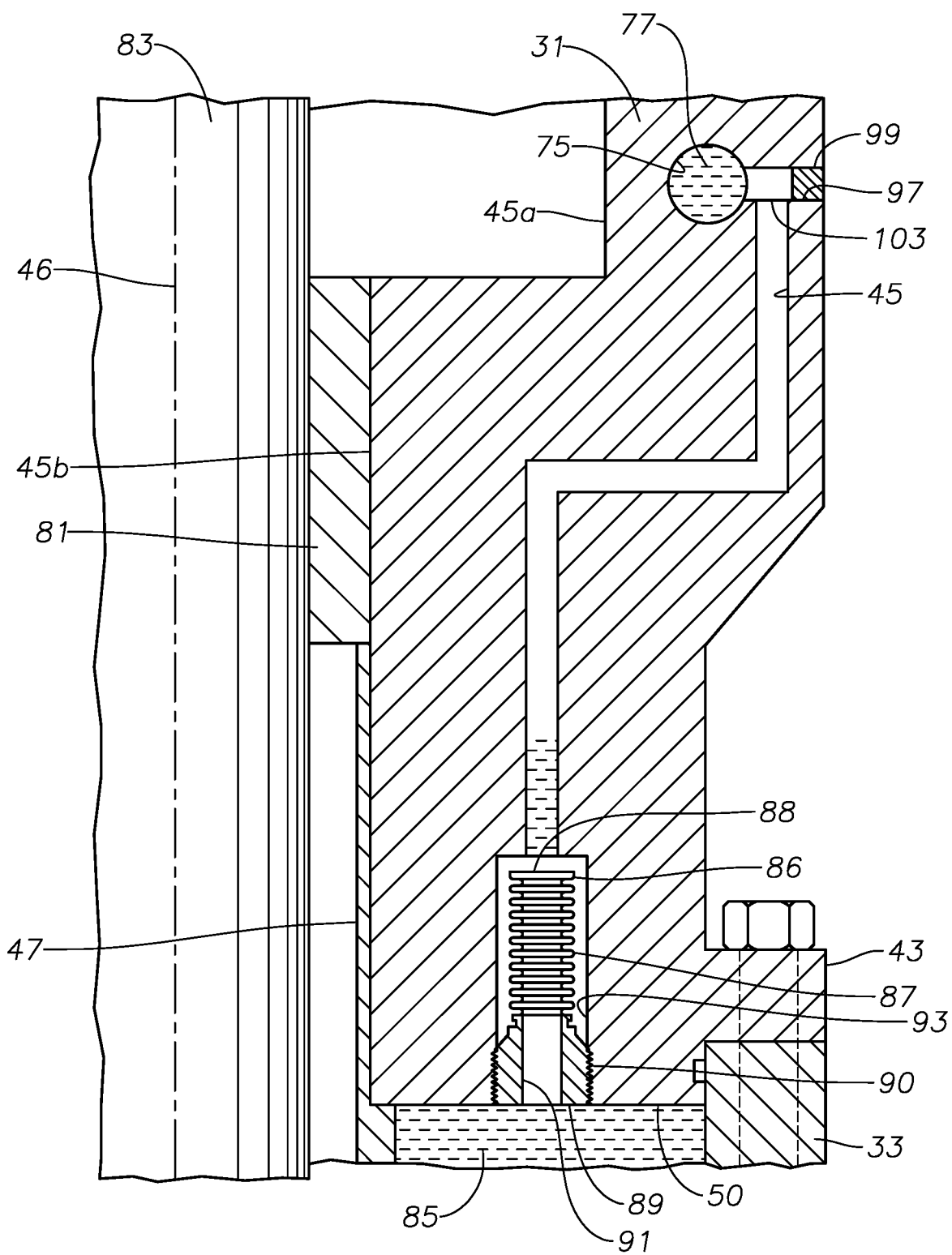
FIG. 6 is an enlarged sectional view of another part of the motor head of FIG. 2, showing the bellows of FIG. 5 installed.

Referring to FIG. 5, a single pressure compensating device, in this example a bellows 86, reduces a pressure difference between barrier fluid 77 (FIG. 6) in all three motor lead passages 51 with motor lubricant 85. Pressure compensating device 86 alternately may be other positive barrier type equalizers, such as pistons or bladder/bags. In this embodiment, bellows 86 is formed of a metal and has a corrugated side wall 87 and a closed end 88. Bellows 86 has a head 89 opposite closed end 88 with external threads 90. Referring to FIG. 6, an inlet 91 extends through bellows head 90 into the interior of corrugated side wall 87. Threads 90 secure bellows head 89 within a bellows chamber 93. In this example, the lower end of bellows chamber 93 is located on motor head lower end 50 to admit motor lubricant 85 into the interior bellows 86. Alternately, the lower end of bellows chamber 93 could be on the exterior of motor head 31 to admit well fluid into bellows 86. The exterior of bellows 86 is in contact with barrier fluid 77.

Bellows chamber 93 may be on an opposite side of axis 46 from the motor lead passages 51 (FIG. 4), as shown. A barrier fluid passage second portion 95 extends into the upper end of bellows chamber 93. A single test port 97 extends from the exterior of motor head 31 through the upper end of barrier fluid passage second portion 95 into barrier fluid reservoir 75. Test port 97 may be located on an opposite side of axis 46 from the motor lead passages 51, as shown. During operation of ESP 11, a plug 99 closes the outer portion of test port 97. Barrier fluid passage second portion 95 intersects test port 97 at a junction 103 between plug 99 and barrier fluid reservoir 75. Junction 103 may be a T-shaped intersection.

During operation of motor 17, junction 103 communicates barrier fluid 77 in reservoir 75 with the exterior of bellows 86. In this embodiment, motor lubricant 85 fills the interior of bellows 86, and barrier fluid 77 surrounds corrugated side wall 87 down to bellows head 89. Corrugated side wall 87 contracts and expands in response to a difference in pressure between motor lubricant 85 and barrier fluid 77.

Figure 7:
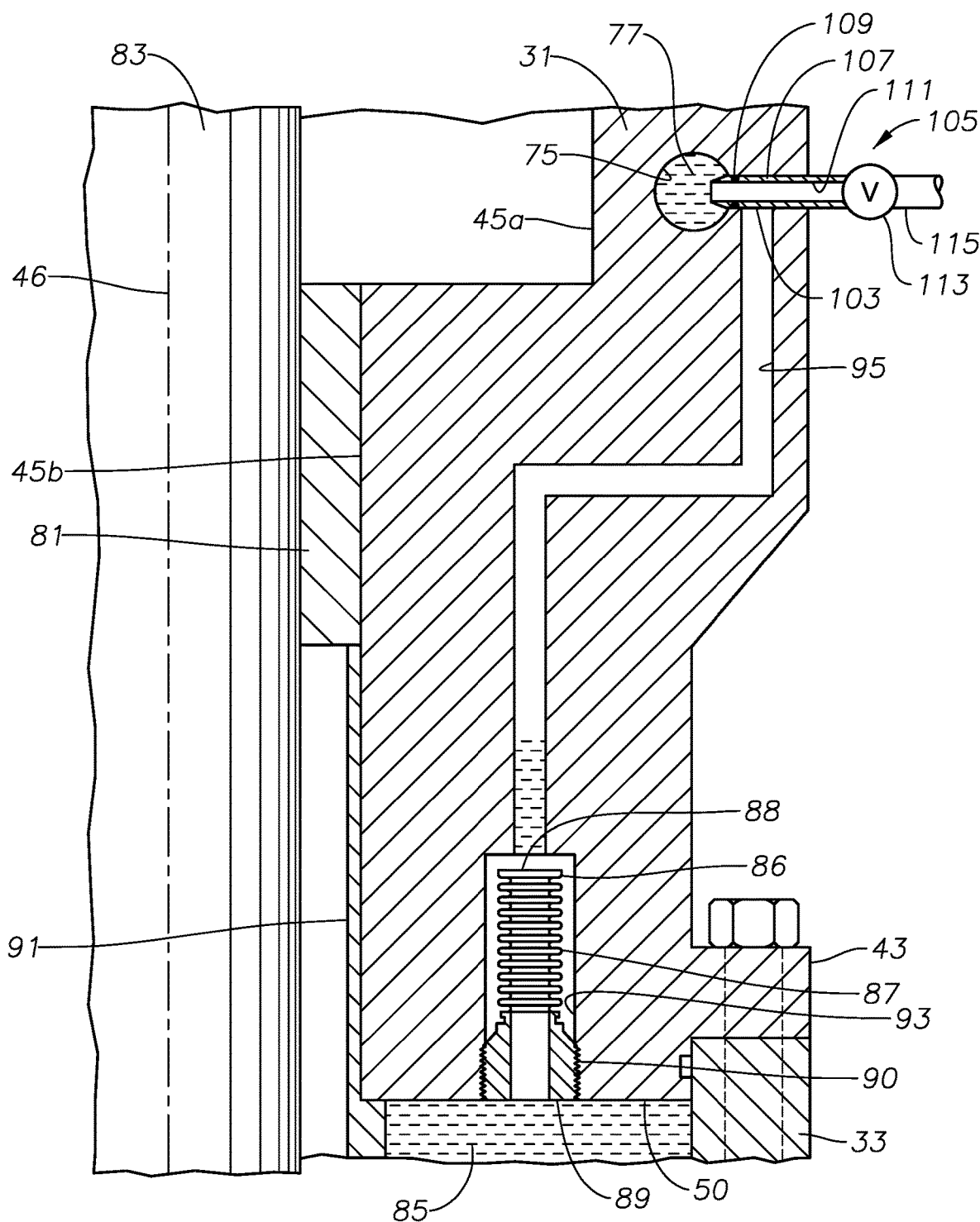
FIG. 7 is a sectional view similar to FIG. 6, but showing the bellows being isolated from test fluid pressure during pressure testing of the seal arrangement.

Referring to FIG. 7, technicians may employ a test tool 105 to pressure test the integrity of seal arrangement 57 (FIG. 4) prior to lowering ESP 11 into a well. Test tool 105 has a tubular stem 107 with a circular seal 109 surrounding stem 107 near its inner end. Stem 107 has a stem passage 111 extending through it. A valve 113 connects a hose 115 to stem passage 111 to supply a pressurized test fluid to reservoir 75. The test fluid may be the same liquid as barrier fluid 77. Stem 107 has a length that places seal 109 in test port 97 between junction 103 and reservoir 75. Stem seal 109 seals between the outer diameter of stem 107 and the inner diameter of test port 97 at a point between junction 103 and reservoir 75. Stem seal 109 isolates the test pressure injected through stem passage 111 into reservoir 75 from barrier fluid passage second portion 95, and thus from bellows 86. The test fluid pressure is applied through the three barrier fluid passage first portions 73 to annular space 72 around each spacer ring 63 between upper seal 59 and lower seal 61 (FIG. 4). After a successful test, the technicians remove test tool 105 and replace plug 99 (FIG. 6).

The present disclosure described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:
1. A well pump assembly, comprising:
an electrical motor for driving a pump, the motor having a motor housing filled with a dielectric motor lubricant;
a motor head on an end of the housing, the motor head having at least one motor lead passage extending from an interior of the housing to an exterior of the motor head, the motor lead passage being in fluid communication with the motor lubricant;

a motor lead extending from the exterior of the motor head into the motor lead passage, the motor lead comprising a metal tube containing an insulated conductor;

a motor wire extending from the interior of the housing into the motor lead passage and having an electrical connector in engagement with the conductor of the motor lead;

an outer seal sealing around the motor lead in the motor lead passage, the outer seal having an outer side adapted to be exposed to well fluid;

an inner seal sealing around the motor lead in the motor lead passage inward from the outer seal, the inner seal having an inner side in contact with the motor lubricant in the motor, the outer and inner seals defining between them an annular space in the motor lead passage;

the inner seal and the outer seal being outward from the electrical connector;

each of the outer and inner seals comprising a ferrule that forms a metal-to-metal sealing engagement between the metal tube and the motor lead passage;

a barrier fluid passage extending into the annular space and containing a barrier fluid that is in contact with an inner side of the outer seal and an outer side of the inner seal; and a pressure compensating device having an inner side in contact with the barrier fluid in the barrier fluid passage for reducing a pressure differential between the barrier fluid and a hydrostatic fluid pressure of well fluid on the exterior of the motor.

2. The assembly according to claim 1, further comprising:
a test port extending from the exterior of the motor head to a junction with the barrier fluid passage, the junction being between the pressure compensating device and the annular space; and means for applying a test pressure to the test port and for blocking the test pressure from the pressure compensating device.

3. The assembly according to claim 2, wherein the means for applying a test pressure comprises:
a test tool having a tubular stem that is insertable into the test port, the stem having a stem seal that seals between the stem and the barrier fluid passage at a point between the annular space and the junction, isolating a stem passage in the stem from the pressure compensating device.

4. The assembly according to claim 1, wherein:
the at least one motor lead passage comprises a plurality of motor lead passages, and wherein the assembly further comprises:
a barrier fluid reservoir in the head;
a pressure equalizing chamber in the head, the pressure compensating device being mounted within the pressure equalizing chamber;
the barrier fluid passage having a plurality of first portions, each of the first portions extending from the annular space in one of the motor lead passages to the barrier fluid reservoir; and
the barrier fluid passage has a second portion extending from the barrier fluid reservoir to the pressure equalizing chamber.

5. The assembly according to claim 4, wherein:
the barrier fluid reservoir is annular and concentric with a longitudinal axis of the head.

6. The assembly according to claim 4, further comprising:
a test port extending from the exterior of the motor head through the second portion of the barrier fluid passage into the barrier fluid reservoir; and
a test tool having a tubular stem that is insertable into the test port and into sealing engagement with the barrier fluid reservoir, thereby communicating a stem passage in the stem to the barrier fluid reservoir and blocking the second portion of the barrier fluid passage from the stem passage.

7. The assembly according to claim 1, wherein:
the barrier fluid passage has an inner end at a junction of the barrier fluid passage with the interior of the motor housing, the inner end of the barrier fluid passage having internal threads; and
the pressure compensating device comprises a metal bellows mounted in the inner end of the barrier fluid passage and having external threads that engage the internal threads.

8. The assembly according to claim 7, wherein:
the inner end of the barrier fluid passage is open to the interior of the housing; and
the bellows separates the motor lubricant in the interior of the housing from the barrier fluid in the barrier fluid passage.

9. A well pump assembly, comprising:
an electrical motor for driving a pump, the motor having a motor housing filled with a dielectric motor lubricant;
a motor head on an end of the housing, the motor head having at least one motor lead passage extending from an interior of the housing to an exterior of the motor head, the motor lead passage being in fluid communication with the motor lubricant;
a motor lead extending from the exterior of the motor head into the motor lead passage;
an outer seal sealing around the motor lead in the motor lead passage, the outer seal having an outer side adapted to be exposed to well fluid;
an inner seal sealing around the motor lead in the motor lead passage inward from the outer seal, the inner seal having an inner side in contact with the motor lubricant in the motor, the outer and inner seals defining between them an annular space in the motor lead passage;
a barrier fluid passage extending into the annular space and containing a barrier fluid that is in contact with an inner side of the outer seal and an outer side of the inner seal;
a pressure compensating device having an inner side in contact with the barrier fluid in the barrier fluid passage for reducing a pressure differential between the barrier fluid and a hydrostatic fluid pressure of well fluid on the exterior of the motor; wherein:
the motor lead comprises a metal tube containing an insulated conductor;
each of the outer and inner seals comprises a ferrule that forms a metal-to-metal sealing engagement between the metal tube and the motor lead passage;
a spacer ring is located in the annular space between the outer and inner seals, the spacer ring being in non-sealing engagement with the motor lead passage; and
a nut is at an entrance of the motor lead passage, the nut, when rotated, exerting an inward directed force against outer seal, through the spacer ring to the inner seal to deform the ferrules of the outer and inner seals into sealing and retaining engagement with the motor lead passage.

10. A well pump assembly, comprising:
a pump;
an electrical motor cooperatively connected with the pump for driving the pump, the motor having a motor housing filled with a dielectric motor lubricant;
a motor head on an end of the housing, the motor head having a longitudinal axis;
three motor lead passages spaced around the axis, each having an open lower end in fluid communication with the motor lubricant in the housing;
three motor leads, each extending from an exterior of the motor head into one of the motor lead passages;
three upper seals, each sealing around one of the motor leads in one of the motor lead passages, each of the upper seals having an upper side adapted to be exposed to well fluid;
three lower seals, each sealing around one of the motor leads in one of the motor lead passages below one of the upper seals, each of the lower seals having a lower side in contact with the motor lubricant in the housing, the upper and lower seals in each of the motor lead passages defining between them an annular space in each of the motor lead passage;
a barrier fluid reservoir within the head and encircling the axis radially inward from the motor lead passages, the barrier fluid reservoir containing a barrier fluid;
three barrier fluid passage first portions, each extending from one of the annular spaces to the barrier fluid reservoir;
a barrier fluid passage second portion extending from the barrier fluid reservoir to a pressure compensating chamber; and
a pressure compensating device in the pressure compensating chamber, the pressure compensating device having one side in contact with the barrier fluid in the pressure compensating chamber for reducing a pressure differential between the barrier fluid and a hydrostatic fluid pressure of well fluid on the exterior of the motor.

11. The assembly according to claim 10, further comprising:
a test port extending from the exterior of the motor head through the barrier fluid second portion to the barrier fluid reservoir; and
a test tool having a tubular stem that is insertable through the test port and the barrier fluid passage second portion into the barrier fluid reservoir, the stem having a stem seal that seals between the stem and the barrier fluid reservoir, the stem having a stem passage leading to the barrier fluid reservoir to apply a test pressure to the barrier fluid reservoir and each of the annular spaces that is blocked by the stem seal from the barrier fluid passage second portion.

12. The assembly according to claim 10, wherein:
each of the motor leads comprises a metal tube containing an insulated conductor;
the upper and lower seals in each of the motor lead passages comprises a ferrule that forms a metal-to-metal sealing engagement between one of the metal tubes and one of the motor lead passages;
a non-sealing spacer ring is located in each of the annular spaces; and
a nut at an entrance of each of the motor lead passage, each of the nuts, when rotated, exerting a downward force against the upper seal, through the spacer ring and to the lower seal within one of the motor lead passages to deform the ferrules of the upper and lower seals into sealing and retaining engagement with one of the motor lead passages.

13. The assembly according to claim 10, wherein:
the pressure compensating chamber has internal threads; and
the pressure compensating device comprises a metal bellows mounted in the pressure compensating chamber and having external threads that engage the internal threads.

14. The assembly according to claim 13, wherein an interior of the metal bellows is in contact with the motor lubricant in the housing and the exterior of the metal bellows is in contact with the barrier fluid in the pressure compensating chamber.

15. The assembly according to claim 10, wherein the barrier fluid reservoir is concentric with the axis.

16. A well pump assembly, comprising:
an electrical motor for driving a pump, the motor having a motor housing filled with a dielectric motor lubricant;
a motor head secured to the housing, the motor head having at least one motor lead passage extending from an interior of the housing to an exterior of the motor head, the motor lead passage being in fluid communication with the motor lubricant;
a motor lead extending from the exterior of the motor head into the motor lead passage;
a motor wire extending from within the housing into the motor lead passage and having an electrical connector in engagement with the motor lead;
a seal arrangement sealing the motor lead in the motor lead passage, the seal arrangement having two seals within the motor lead passage, the two seals defining an annular space between them;
a barrier fluid passage extending within the motor head from the annular space in motor lead passage to a pressure compensating device chamber, the barrier fluid passage containing a barrier fluid;
a pressure compensating device mounted in the pressure compensating device chamber for reducing a pressure differential between the barrier fluid and a hydrostatic fluid pressure of well fluid on the exterior of the motor;
a test port extending from the exterior of the motor head to a junction with the barrier fluid passage; and
a test tool having a tubular stem that is insertable into the test port, the stem having a stem seal that seals between the stem and the barrier fluid passage at a point between the annular space and the junction, enabling test fluid pressure to be applied to the annular space that is isolated from the pressure compensating device by the stem seal.

17. The assembly according to claim 16, wherein:
the at least one motor lead passage comprises a plurality of motor lead passages, and the assembly further comprises:
an annular barrier fluid reservoir encircling an axis of the motor head;
the barrier fluid passage having a separate first portion extending from each of the motor lead passages to the reservoir; and
the barrier fluid passage having a second portion extending from the reservoir to the pressure compensating device chamber.

18. The assembly according to claim 16, wherein, the pressure compensating device chamber has one side in contact with the motor lubricant in the housing and another side in contact with the barrier fluid.

19. The assembly according to claim 16, wherein:

the motor lead comprises a metal tube containing an insulated conductor;

each of the seals comprises a ferrule that forms a metal-to-metal seal between the metal tube and the motor lead passage;

a spacer ring is located between the seals, the spacer ring being in non sealing engagement with the motor lead passage; and a nut engages threads at an entrance of the motor lead passage, the nut, when rotated, exerting a force against the seals and through the spacer ring to deform the seals into sealing and retaining engagement with the motor lead passage.

20. The assembly according to claim 16, wherein:

the pressure compensating device comprises a metal bellows;

the pressure compensating device chamber has internal threads; and the pressure compensating device comprises a bellows having external threads that engage the internal threads.

* * * * *